US007386305B2

(12) United States Patent
Etkin et al.

(10) Patent No.: US 7,386,305 B2
(45) Date of Patent: Jun. 10, 2008

(54) SYSTEM AND METHOD FOR SELECTIVELY FORMING AND ROTATING A TRANSMISSION BEAM

(75) Inventors: Raul Hernan Etkin, Albany, CA (US); Mehmet I. Gurelli, San Diego, CA (US); Rashid Ahmed Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 10/251,122

(22) Filed: Sep. 20, 2002

(65) Prior Publication Data

US 2004/0204108 A1 Oct. 14, 2004

(51) Int. Cl.
*H04Q 7/20* (2006.01)

(52) U.S. Cl. ............... 455/422.1; 455/562.1; 455/561

(58) Field of Classification Search ............... 455/504, 455/63.1, 63.4, 65, 561, 562.1, 422.1
See application file for complete search history.

(56) References Cited

U.S. PATENT DOCUMENTS 6,151,513 A * 11/2000 Petry et al. ............... 455/562.1

6,236,866 B1 * 5/2001 Meyer et al. ............... 455/562.1
6,583,760 B2 * 6/2003 Martek et al. ............... 342/373
2004/0116125 A1 * 6/2004 Terry ........................... 455/450

FOREIGN PATENT DOCUMENTS

| WO | 01/24385 A2 | 4/2001 |
| WO | 01/28036 A1 | 4/2001 |
| WO | WO 01/24385 A2 * | 4/2001 |
| WO | 02/03721 A2 | 1/2002 |

* cited by examiner

*Primary Examiner*—Duc M. Nguyen
*Assistant Examiner*—Justin Lee
(74) *Attorney, Agent, or Firm*—Thomas R. Rouse; Kenyon S. Jenckes; Sayed Hossain Beladi

(57) ABSTRACT

Broadly speaking, the invention comprises systems and methods that use the number of mobile stations, denoted by N, communicating with a base station, as a variable that determines the optimum induced change rate, R, and the antenna beam width, W, of a time-varying base station antenna gain pattern used in conjunction with a forward power modulation (FPM) or a similar scheme to maximize the overall data throughput from the base station by taking advantage of multi-user diversity. In one embodiment, the FPM scheme is turned off if N is below a lower threshold. If N is above this threshold, the FPM scheme is turned on with R and W set to appropriate values. Generally, higher values of N correspond to higher values of R and lower values of W.

47 Claims, 6 Drawing Sheets

SYSTEM AND METHOD FOR SELECTIVELY FORMING AND ROTATING A TRANSMISSION BEAM

FIELD OF THE INVENTION

The invention relates generally to cellular wireless data communication systems, and more particularly to systems and methods for selectively utilizing a time-varying directional antenna gain pattern to optimize the data throughput in a wireless data communication system.

BACKGROUND

In a cellular wireless data communication system, a base station is associated with a sector. Mobile stations within the sector may access the Internet or other data networks via the base station. Typically, each mobile station only communicates with a single base station (strictly speaking, the mobile stations may be in handoff with several base stations, however such details are outside the scope of this disclosure and do not prevent the applicability of the invention). The base station, however, must be able to communicate with all of the mobile stations within its sector.

The connection between a base station and a mobile station comprises a "forward link" (FL) which refers to the flow of information from the base station to the mobile station, and a "reverse link" (RL) which refers to the flow of information from the mobile station to the base station. The information transmitted on the forward and reverse links mostly consists of user data (such as web pages, electronic mail, etc.) encoded and modulated appropriately, but it also includes control information (such as power control, data rate control, etc.)

The terms "capacity" or "(overall) throughput" from a base station refers to the amount of user data bits transmitted per second (measured in units of bits per second) on the forward link to all mobile stations in the sector. A similar definition also holds for the reverse link capacity or throughput.

Contrary to a cellular wireless voice communications system which requires equal amounts of throughput on the forward and reverse links, a cellular wireless data communication system usually requires higher throughput on the forward link. This is because a typical Internet access usually involves "downloading" web pages or computer files from the Internet to the user's mobile station (such as a laptop equipped with proper hardware), although "uploading" large files (such as large electronic mail attachments) are also very common. The fact that the Internet is an extremely large source of information is the main reason for asymmetrical throughput requirements on the forward and reverse links.

Another important difference between a voice communications system and a data communications system is that in data communications, the delay in receiving data can be tolerated to a much larger degree than the delay in voice communications. With this flexibility, a data-only communications system may provide much better throughput than a system that transmits data over a voice-optimized network.

One such cellular wireless data communications system is the cdma2000 1×EV-DO system (also known as IS-856), an evolution of IS-95 family of CDMA standards, designed in particular for wireless Internet access. The name "1×EV-DO" refers to the relation to the cdma2000 family ("1×") and the evolution of the standard ("EV") for data optimized ("DO") operation. The 1×EV-DO system is optimized for wireless Internet access, for which a high data throughput on the Forward Link is desirable. Furthermore, the Forward Link data transmissions are not as delay-sensitive, as compared to a voice transmission system. As a result, the base station can transmit data to individual mobile stations discontinuously in a time-division multiplexed manner. The 1×EV-DO system provides a 1.25 MHz channel, and utilizes the same RF components as used in the existing IS-95 networks and devices. 1×EV-DO has the same coverage as IS-95 and cdma2000 networks.

The 1×EV-DO system defines 12 different data rates (and the corresponding data packet structures, such as packet duration, modulation type, etc) on the forward link ranging from 38.4 kbps to 2.4 Mbps (in addition to the null rate). Although the invention will be mostly described in the context of a 1×EV-DO system in this disclosure, it may also be applied to certain other systems.

In the 1×EV-DO system, the data rate at which a mobile station is served is determined by the mobile station, based on the quality of the received signal from the base station. The quality of the received signal is typically measured in terms of the signal-to-interference-and-noise ratio (SINR). As the SINR level of transmissions received by a mobile station increases, the mobile station becomes capable of successfully receiving data at higher data rates. The mobile station predicts the maximum data rate that it can reliably receive based on its measurements and predictions of the SINR conditions, and requests this maximum data rate from the base station via the reverse link data rate control (DRC) channel. The SINR, however, typically fluctuates in time over a wide range. This is mainly due to the movement of the mobile station and the surrounding objects. Consequently, the maximum data rate that a mobile station can reliably support is dynamically determined based on the channel conditions. For this purpose, the 1×EV-DO system allows the requested data rate to be updated as often as 600 times per second.

In the 1×EV-DO system, the mobile stations are served in a time-division multiplexed manner. Unlike a classical time-division multiple access (TDMA) system, however, the time intervals over which a mobile station is served are not pre-allocated. Rather, the base station dynamically makes scheduling decisions to determine which mobile station to serve at a given time based on the periodically received DRC information from all mobile stations.

The base station may accomplish scheduling decisions for data transmissions to the mobile stations in its sector by utilizing a scheduling algorithm. One type of scheduling algorithm is referred to as a "proportional fair scheduler". A proportional fair scheduler is designed to balance the often conflicting requirements of fairness of service among the mobile stations against the maximization of the overall forward link sector throughput. More specifically, the proportional fair scheduler performs scheduling decisions by selecting the mobile station for which a certain decision metric is maximized. The decision metric for a given mobile station is the ratio of the requested data rate by that mobile station to a weighted average of the data throughput transmitted so far by the base station to that mobile station.

The effect of using the proportional fair scheduler is to schedule mobile stations when their SINR values are large with respect to their average values, thus increasing the overall throughput of the base station while achieving fairness among the mobile stations. As a result of the SINR fluctuations seen independently by each mobile station, the scheduler tends to distribute service among the mobile stations, each at or close to its peak supportable data rate.

With the use of the proportional fair scheduler, the overall throughput of the base station increases in general with the increasing number of mobile stations in the sector. This is because of the fact that, at any given time, the probability of finding a mobile station that requests a very high data rate relative to its own average throughput increases as the number of mobile stations in the sector increases. The gain in the overall base station throughput as a function of the number of mobile stations is referred to as the "multi-user diversity gain". Multi-user diversity gain generally increases when the number of mobile stations in the sector increases, and also when the dynamic range of the SINR fluctuations seen by each of the mobile stations increases (even when the average SINR may remain the same).

While it may not be practical to increase the number of mobile stations in the sector, there are ways to artificially increase the dynamic range of the SINR fluctuations seen by the mobile stations. One way to accomplish this is to use a forward power modulation (FPM) scheme that induces SINR fluctuations. In one such scheme, a two-element antenna array is utilized to form a highly directional antenna gain pattern (also referred to as a "beam"). The two antennas are placed sufficiently close to each other and their boresights are aligned. The power gain of the second antenna is kept at a certain fixed fraction of the first antenna. The phase of the second antenna relative to the first antenna is, however, varied linearly in time at a fixed rate, such as 2 cycles per second. The result is a time-varying antenna gain pattern where the highly directional beam sweeps across the sector periodically.

In another embodiment, an antenna system by which a FPM style approach can be developed may comprise an array of highly directional antenna elements, each directed towards a fixed sub-sector of a given sector and forming a beam sub-pattern. The antenna gain sub-patterns are non-overlapping to a large degree, alleviating the need to control relative phases of the array elements. The power gains of each element, however, can be individually controlled with the only restriction being that the total transmitted power from the antenna array is maintained at a fixed value and the power transmitted from individual array elements are maintained between a lower and an upper level to avoid excessive interference to other sectors. In such a system, an FPM method would be based on periodically changing each element (such as a few hundred milliseconds in every second) of the array and setting its power gain at a high value while setting the remaining element power gains to some predetermined levels. Such a scheme would also result in a highly directional overall antenna gain pattern periodically sweeping across the sector. In such a case, the index of the antenna to which the highest power gain is allocated would be the controlling parameter (as opposed to the previously described two antenna case in which the phase of the second antenna was the controlling parameter).

In all of the above described FPM schemes, the highly directional antenna gain pattern periodically sweeps across the sector. As the beam sweeps over a particular mobile station, the SINR value for that mobile station tends to peak and then fall off. Similar approaches to artificially induce SINR fluctuations include opportunistic beam forming (OBF), and various schemes based on other antenna structures.

In this disclosure, we will often use the term "rotating a beam" to refer to varying the parameters of a directional antenna gain pattern in time so as to vary the antenna gain pattern and provide a high signal strength to various regions of the sector in a time-varying (periodic or aperiodic) manner. The term is used for conciseness, and does not necessarily imply an actual rotation of a fixed shaped beam at a fixed angular velocity. In one embodiment, the directional antenna gain pattern may consist of multiple local peaks that sweep a sector in time.

It should be noted that another advantage of FPC, OBF, and similar methods of artificially inducing SINR fluctuations is that especially if properly coordinated among all base stations, these schemes may also improve average SINR received by a mobile station (especially one that is in handoff between two or more sectors) by reducing the interference received from other sectors while the desired base station is beam forming to the mobile station.

The FPM scheme and similar schemes work well if there are a large number of mobile stations distributed throughout the sector, because it becomes more probable, as the number of mobile stations increase, that at least one of them will be receiving a high SINR level at any given time and will therefore be selected by the scheduler. If, however, there are only a few mobile stations in the sector, the FPM scheme and similar approaches may not perform well. This is because there are periods of time when the beam is not directed to any of the mobile stations, so they all have relatively low SINR levels and therefore request low data rates from the base station. Thus, no multi-user diversity gain is achieved. In fact, if the number of mobile stations is low enough, the FPM scheme and similar schemes may actually cause a degradation in the overall data throughput from the base station.

SUMMARY OF THE INVENTION

Broadly speaking, the invention comprises systems and methods for controlling various parameters of an antenna array used in conjunction with a FPM scheme or a similar scheme, as a function of the number of mobile stations in a sector to optimize the overall base station data throughput.

Among the parameters of an antenna array that may be selected as a function of the number of mobile stations are the beam width (it is assumed that the maximum antenna gain increases with decreasing beam width) and the rate of induced SINR fluctuations, or "rotation speed" (which may be quantified in units of cycles per second). Each of these two parameters will be further elaborated on in the following paragraphs.

The beam width can be controlled in various ways, depending on the antenna system in use. In particular, for the two-element FPM scheme described earlier, the power gain of the second antenna relative to the first antenna determines the maximum value of the antenna gain pattern and therefore, to some extent, the beam width.

The beam width in an FPM scheme has important effects on sector throughput. These effects depend on the number of mobile stations receiving service from the base station. In general, the beam width has to be large for small number of users, and small for large number of users. This is related to the fact that, for a given number of mobile stations, as the beam gets narrower, the average SINR value for mobile stations in front of the beam would increase. The probability of randomly finding a mobile station in front of the beam, however, would be lower. The overall effect is that, for a given fixed number of mobile stations, there is an optimum beam width that maximizes the sector throughput. For small number of users, a broader antenna gain pattern would provide the best throughput, whereas highly directional narrow beam patterns would be preferred in the presence of many users distributed across the sector.

The rate of induced channel fluctuations (that is, the beam rotation speed) may also be controlled in various ways, depending on the antenna system in use. For the two-element FPM system described earlier, the fluctuation rate is simply determined by the rate at which the phase of the second antenna relative to the first antenna is varied (such as 2 cycles per second). The rate of induced SINR fluctuations also has important effects on the overall base station throughput, and these effects depend on the number of mobile stations as well. Fast induced SINR fluctuations usually cause a degradation in SINR prediction by the mobile station, resulting in lower requested data rates, among other undesirable effects. Therefore, from a prediction point of view, the induced SINR fluctuations should be as slow as possible. On the other hand, in order to take advantage of the multi-user diversity gain by the proportional fair scheduling algorithm (and also to avoid high delay variability in data packet transmissions), the base station should induce sufficiently rapid SINR fluctuations. Furthermore, as the number of mobile stations increases, it may be better to increase the rate of induced SINR fluctuations so that each of the mobile stations will have a good chance of being selected during its peak SINR condition within a reasonable delay window for the proper operation of the upper layer protocols, such as TCP/IP. A practical delay window may be approximately 2 seconds or less.

Another important observation is that, as the beam width gets narrower, a higher fluctuation rate may be more appropriate. This is because, as the beam width gets narrower, the peak SINR received by a mobile station gets higher, thereby increasing the peak data rate that can be requested by the mobile station. In the 1×EV-DO system, the duration of packets for higher data rates are mostly shorter than the duration for lower rate packets. Therefore, not only is the prediction for high rate packets potentially more reliable compared to the prediction for low rate packets (strictly speaking, this depends on the channel conditions, among other factors), but also higher data rates require a smaller amount of time to transmit a certain amount of data to a mobile station. Therefore, with narrower beam patterns, the fluctuation speed can be increased.

In addition to the beam width and fluctuation rate described above, the overall shape of the antenna gain pattern may also be optimized as a function of these parameters. In particular, with beamforming turned on, the base station antenna pattern must still have sufficient gain in other directions to aid system acquisition for new mobile stations and for other purposes.

If the number of mobile stations in a sector is small, then the above described beam width and fluctuation rate parameters may approximately degenerate into simply turning off the FPM system, and turning on a fixed broad antenna gain pattern.

Although this disclosure often considers a periodic time-variation scheme for the antenna gain pattern, the periodicity is not necessary. In one embodiment, the induced fluctuations may be aperiodic. In this case, the fluctuation rate may be quantified in other suitable means, such as the average rate at which a given region in the sector receives a peak signal strength.

Based on the above described issues, the beam width and fluctuation rate parameters for a time-varying antenna gain pattern can be optimized for each possible number of mobile stations. Alternatively, a more coarse approach can be taken and the optimum setting of the parameters can be determined for various ranges of number of mobile stations, rather than using a separate setting for every possible number of mobile stations.

In one embodiment, a method comprises identifying the number of mobile stations that are communicating with a base station and then selecting a fluctuation rate and beam width for the antenna gain pattern utilized in conjunction with a FPM scheme or a similar scheme to maximize the overall data throughput of the base station. If the number of mobile stations is less than a lower threshold number, $N_1$, the base station discontinues the FPM scheme and selects a time-invariant gain pattern with a fixed broad antenna gain pattern. If the number of mobile stations is greater than or equal to $N_1$, but less than a higher threshold $N_2$, the time-varying antenna gain pattern speed is set to some medium value and the beam width is also set to a medium level. If the number of mobile stations is greater than or equal to $N_2$, a higher fluctuation rate and a narrower beam width is selected.

In one embodiment, the base station may also be configured to determine the beam width and fluctuation rate based on only the number of mobile stations for which the amount of data waiting to be transmitted (i.e., the queue length) exceeds a certain value. In this case, priority will be given to users for which sufficiently large amounts of data have been queued at the base station for transmission on the forward link.

In one embodiment, the base station may discontinue inducing SINR fluctuations and turn on a fixed broad antenna gain pattern during the transmission of broadcast information, such as the control channel in a 1×EV-DO system.

Another embodiment of the invention comprises a software application. The software application is embodied in a computer-readable medium such as a floppy disk, magnetic tape, CD-ROM, DVD-ROM, RAM, ROM, or the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

Other objects and advantages of the invention may become apparent upon reading the following detailed description and upon reference to the accompanying drawings.

Figure 1:
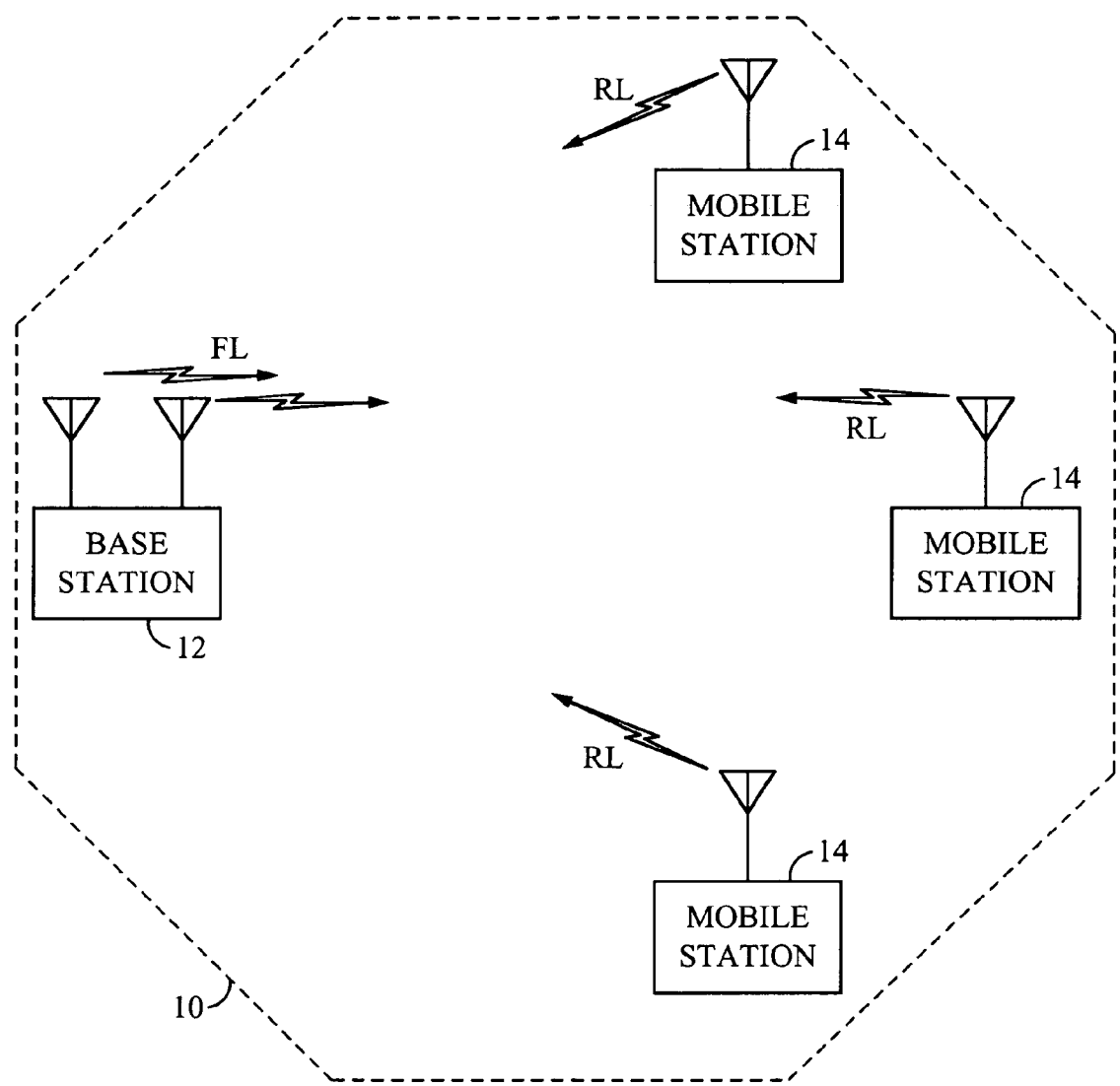
FIG. 1 is a diagram illustrating a wireless communication system capable of operation in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

Broadly speaking, the invention comprises systems and methods for controlling the fluctuation rate (that is the rate of induced SINR fluctuations which may be quantified in units of cycles per second if the induced fluctuations are periodic) and potentially the beam width of a time-varying base station antenna gain pattern used in conjunction with a FPM or similar scheme to optimize the overall data throughput from a base station, as a function of the number of mobile stations communicating with the base station.

In one embodiment, a method comprises identifying the number of mobile stations within a sector that are communicating with the sector's base station, and then selecting a fluctuation rate and a beam width to maximize the data throughput from the base station in conjunction with a FPM or a similar scheme. The base station turns off the FPM and turns on a time-invariant broad antenna gain pattern if the number of mobile stations is less than a lower threshold, $N_1$. This way, the base station will be able to provide good coverage to the whole sector. If the number of mobile stations is greater than or equal to $N_1$, but less than a higher threshold $N_2$, the fluctuation rate (denoted by "R") and the beam width (denoted by "W") are set to some pre-selected medium values, $R_1$ and $W_1$, respectively. Exemplary values for $R_1$ may be 1 to 4 cycles per second. Exemplary values for $W_1$ may be 45 to 60 degrees. If the number of mobile stations is greater than or equal to a higher threshold $N_2$, the beam width is set to a small value $W_2$, and the fluctuation rate is set to a high value $R_2$. If $N_2$ is set to a very large value, the base station will either turn off the FPM scheme (if the number of mobile stations is less than $N_1$), or otherwise use some fixed values for the fluctuation rate and the beam width. That is, the effect of $N_2$ will be taken out.

In another embodiment, the base station may use more than two thresholds such as $N_1$, $N_2$, $N_3$, etc. If the number of mobile stations is less than $N_1$, the FPM scheme will be turned off as described above. If the number of mobile stations is greater than or equal to $N_k$, but less than $N_{k+1}$ for some k=1, 2, 3, etc, then the fluctuation rate and beam width will be set to some predetermined values $R_k$ and $W_k$, respectively. Typically, but not necessarily, $R_k$ increases and $W_k$ decreases by increasing value of k. The appropriate values for $R_k$ and $W_k$ may be predetermined by simulation, field tests, analytical methods, a combination of all, or by any other means.

Referring to FIG. 1, a diagram illustrating a wireless communication system in one embodiment is shown. In this system, a sector 10 includes at least one base station 12 and several mobile stations 14. Base station 12 transmits data to the mobile stations 14 via what is referred to herein as the forward link (FL). Mobile stations 14 transmit data back to base station 12 via what is referred to herein as the reverse link (RL). Mobile stations may move within the sector, or they may move out of the sector associated with base station 12 and into a sector associated with another base station.

Base station 12 is configured to perform time-varying beamforming operations through the use of one or more antenna arrays in conjunction with an FPM scheme or a similar scheme. "Beamforming" is used herein to refer to the forming of a directional antenna gain pattern for the forward link of a base station. In one embodiment, an antenna array consisting of two antenna elements is utilized. Each antenna element itself has a fixed, possibly directional, but relatively broad gain pattern. A first one of these antennas transmits a signal with a constant amplitude gain and phase, while the other of the antennas transmits the same signal, but at a possibly lower amplitude gain and with a time-varying phase shift relative to the first antenna. The two signals interfere with each other, constructively in some regions and destructively in others, resulting in a modified time-varying antenna gain pattern, which is possibly narrower and more directional than either of the two individual antenna gain patterns.

Figure 2:
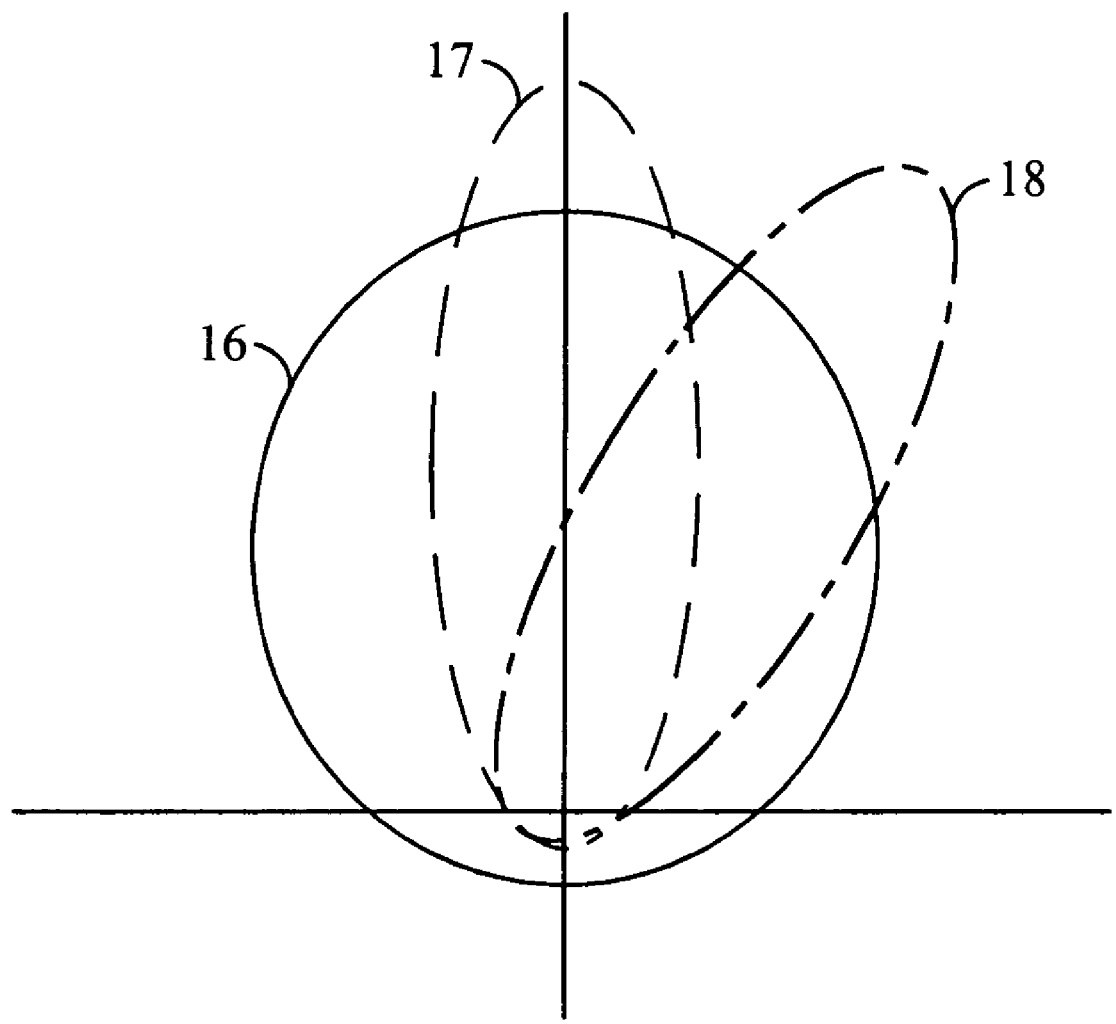
FIG. 2 is a diagram illustrating different antenna gain patterns utilized by a base station in accordance with an embodiment.

Referring to FIG. 2, a diagram illustrating various possible antenna gain patterns for the base station's 12 forward link is shown. In the absence of the phase-shifted second signal from the secondary antenna, the antenna gain pattern of the forward link is constant and generally broad 16. The inclusion of a second antenna with a phase shift causes the overall antenna gain pattern to become more directional 17. The phase shift of the second signal can be varied with time as in a FPM scheme. As the phase shift is incremented linearly, the beam sweeps across the sector 10 periodically (see beam 18).

As the base station 12 transmits signals (beamformed or otherwise), each of the mobile stations 14 within the sector 10 receives the signal and computes a SINR. The mobile station 14 then selects a corresponding data rate that can be supported and transmits this requested data rate information to the base station 12 over the reverse link DRC (data rate control) channel. The strength of the signal received by each of the mobile stations 14 will vary as the beam transmitted by the base station 12 sweeps through the sector 10. Each mobile station 14 periodically computes the SINR level of the received signal and transmits the corresponding DRC information to the base station 12. The SINR levels and requested data rates for a given mobile station 14 will be higher when the beam is directed toward the mobile station 14, and lower when the beam is directed away the mobile station 14. Also, SINR fluctuations are influenced by the interference received from other sectors, which also varies in time as the corresponding beams are varied.

In addition to the DRC feedback described above, the mobile stations and the base station may also be configured for channel state feedback by other means. As an example, the mobile station may transmit SINR information to the base station.

The base station 12 is configured to identify the mobile stations 14 in the sector 10 based upon the DRCs transmitted to the base station 12 by the mobile stations 14. The base station 12 then determines the fluctuation rate and the beam width based on the number of mobile stations 14 in the sector 10 as described earlier.

cdma2000 1×EV-DO (also known as IS-856) is a data communication standard based on the IS-95 family of code division multiple access (CDMA) standards. The name "1×EV-DO" refers to the relation to the CDMA2000 family ("1×") and the evolution of the standard ("EV") for data optimized ("DO") operation. The 1×EV-DO system is mainly optimized for wireless Internet access for which a high data throughput on the Forward Link is desirable. Furthermore, the Forward Link data transmissions are not as delay sensitive as compared to a voice transmission system, therefore the base station can transmit data to individual mobile stations discontinuously based on a scheduling algorithm. 1×EV-DO provides a 1.25 MHz channel, and utilizes the same RF components as used in existing networks and devices. 1×EV-DO has the same coverage as cdmaOne and cdma2000 networks.

A 1×EV-DO system defines communication at 12 different data rates (and the corresponding data packet structures, such as packet duration, modulation type, etc) ranging from 38.4 kbps to 2.4 Mbps (in addition to the null rate). A data packet corresponding to a nominal rate of 38.4 kbps requires up to 16 slots to be transmitted (which may be decoded in less than 16 slots, effectively increasing the data rate), while a packet transmitted at 2.4 Mbps requires a single slot. (A "slot" in this system is a 5/3 millisecond period in which 2048 CDMA chips can be transmitted.) Typically, the packet error rate (a key indicator of performance) as a function of the packet-averaged SINR drops off fairly sharply above a certain rate dependent SINR threshold. At a SINR above this threshold, the performance of data transfers at the corresponding data rate is expected to be better than a minimum level. If the SINR is below the threshold, the performance of data transfer is expected to be worse than the minimum level. Thus, for any given SINR level at which the signal from a base station is received by a mobile station, a maximum data rate that can be supported (e.g. one at which the error rate is less than or equal to an acceptable level) can be identified.

From the perspective of a mobile station, the SINR varies as a function of time. The SINR may vary as a result of movement of the mobile station or the surrounding objects, changes in atmospheric conditions, and various other factors including artificial means such as the FPM scheme and similar schemes implemented by a base station. Because the SINR is variable, the mobile station is configured to dynamically select a data rate which is appropriate for the currently measured SINR. For example, if the SINR is very low, the mobile station may select a data rate of 38.4 kbps. If, on the other hand, the SINR is very high, a higher data rate can be supported, and the mobile station may select a data rate of 2.4 Mbps. The mobile station then transmits a DRC to the base station requesting that data be transmitted to the mobile station at the selected data rate.

It should be noted that, typically, the mobile station does not select the DRC based upon computation of an instantaneous SINR, but instead uses a prediction and rate control algorithm. This is because the mobile station needs to forecast the future SINR condition and accordingly request a data rate for the next packet (via the reverse link DRC channel) that can be decoded with a low probability of error.

The mobile station measures the SINR based upon the pilot burst which is transmitted twice in every slot. The pilot burst consists of a 96-chip signal in the middle of each half-slot. The pilot burst signal is received by all mobile stations within a base station's sector. Each mobile station computes its own SINR based upon the pilot burst signal as received by that mobile station.

It should be noted that, although one embodiment uses the pilot burst to calculate the SINR, it may be possible to make the SINR calculation based upon other portions of the signal received from the base station.

After the mobile station has calculated the SINR based on the pilot burst signal, the measurement is fed to a predictor and rate control system. A DRC indicating the selected data rate is then transmitted back to the base station to request that data be transmitted to the mobile station at the selected rate. The SINR is re-calculated every halfslot and fed into the prediction and rate control algorithm. A new requested data rate is determined as often as once every slot, or up to 600 times per second. The requested data rate is then maintained by the base station for that mobile station for a predetermined number of slots. Typically, the number is four slots for a mobile station which is active in two or more geographically separated base stations (in handoff between such base stations), and two slots otherwise.

It should be noted that the computation of the instantaneous SINR is carried out concurrently by each of the mobile stations. Each mobile station selects the highest data rate that can be supported with sufficiently low probability of error based on a predicted SINR and transmits a DRC signal to the base station. The base station separately maintains the DRCs for the individual mobile stations and transmits data to the various mobile stations at the data rates requested by the respective mobile stations in a time-division multiplexed manner based on a scheduling algorithm.

If the base station uses a fixed (time-invariant) antenna gain pattern, the SINR fluctuations received by a mobile station are mainly due to the fading characteristics of the channel which mostly depend on the speed of the mobile station. If the mobile station is moving slowly, than the channel fading may be too slow to give rise to multi-user diversity gain (a similar situation may occur in very fast fading as well for reasons related to the unpredictability of SINR requiring packet transmissions to be based on a long term average of the SINR). On the other hand, if the base station uses a time-varying antenna gain pattern in conjunction with a FPM scheme, the measured SINR will exhibit fluctuations that can be exploited by the scheduler, even if the mobile station is not moving.

Figure 3:
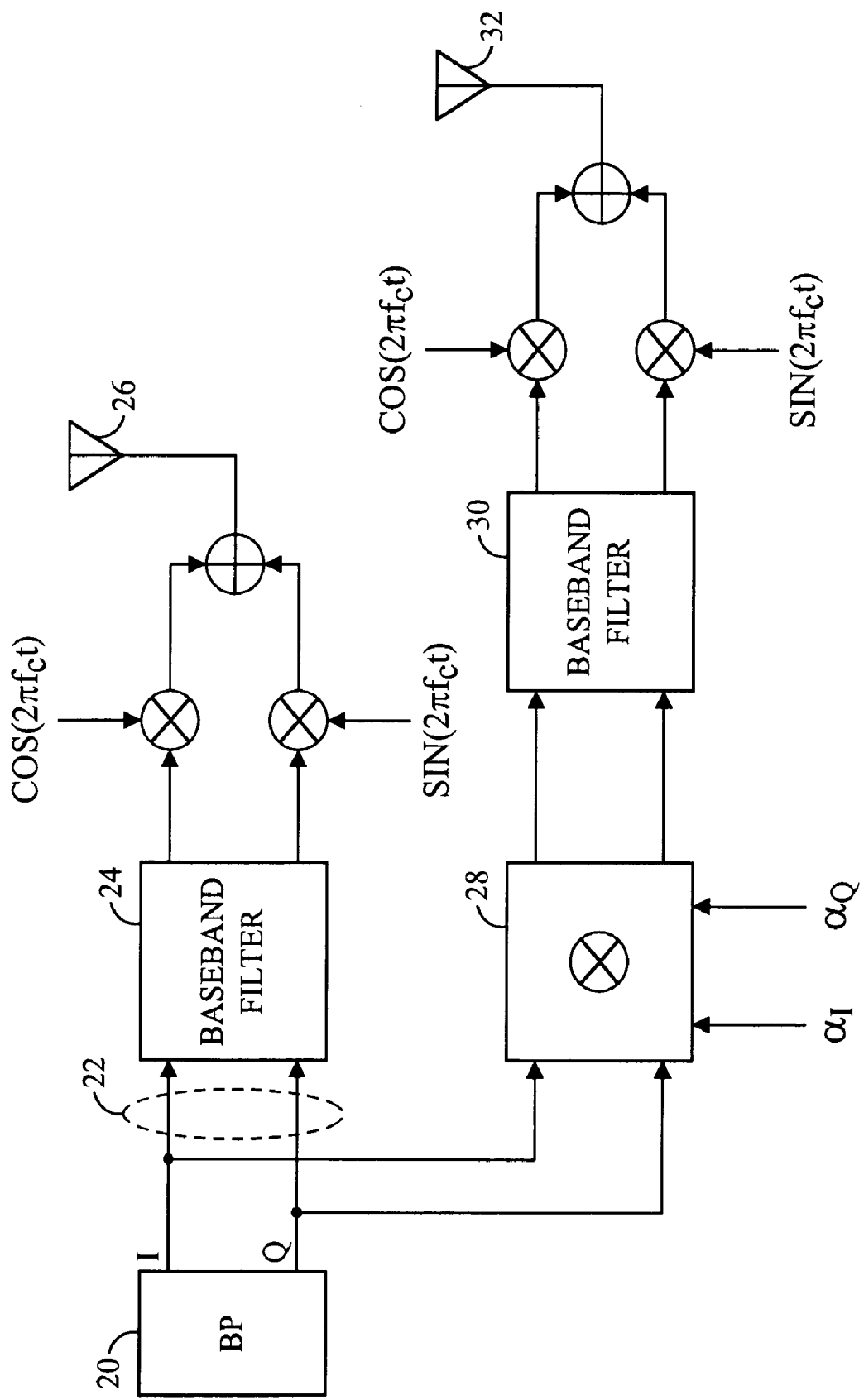
FIG. 3 is a functional diagram illustrating the structure of the signal transmission system of a base station performing FPM operations in one embodiment.

As described earlier, in one embodiment, the base station 12 utilizes two antennas to implement a FPM scheme. Referring to FIG. 3, a functional diagram illustrating the structure of the signal transmission system of a base station 12 in one embodiment is shown. In this figure, baseband processor 20 generates a complex signal to be transmitted (the real and imaginary parts are denoted by I an Q, respectively). The signal is transmitted via interconnects 22 to a baseband filter 24 for processing. The complex signal is then modulated and summed before being transmitted by primary antenna 26.

The complex signal generated by baseband processor 20 is also provided to a complex multiplier 28. Complex multiplier 28 modifies the amplitude and phase of the complex signal before the signal is processed by a baseband filter 30, modulated, summed and transmitted by antenna 32. Antenna 32 is located close to antenna 26. In one embodiment, complex multiplier 28 reduces the amplitude of the signal and introduces a phase shift so that the resulting signal interferes with the signal from antenna 26 (constructively in some regions and destructively in others) to form a shaped antenna gain pattern. The antenna gain pattern is shifted from a generally broad pattern 16 to a more elongated pattern 17 that is referred to herein as a "beam". The function of the complex multiplier 28 can be accomplished somewhere else in the system. For example, a phase and amplitude shifter may follow the summation block preceding antenna 32.

In one embodiment, the phase of the complex multiplier 28 may be linearly incremented in time so that the beam sweeps through the sector 10 of the base station 12. If the secondary signal is turned off, a generally broad time-invariant gain pattern is formed. If the secondary signal is turned on and a constant phase shift is introduced, the beam is formed, but does not sweep the sector.

It should be noted that, the particular components employed by the base station 12 described above to process the signal for transmission may not be necessary for every possible embodiment. Other embodiments may perform entirely different processing. In fact, it is not even necessary that the beam be shaped by the phase-shifting means described above, as long as the beam can be shaped in some controlled manner. The point of the illustrated embodiment is to show that a beam is formed and can be manipulated as a function of some control parameter (e.g., phase shift).

Figure 4:
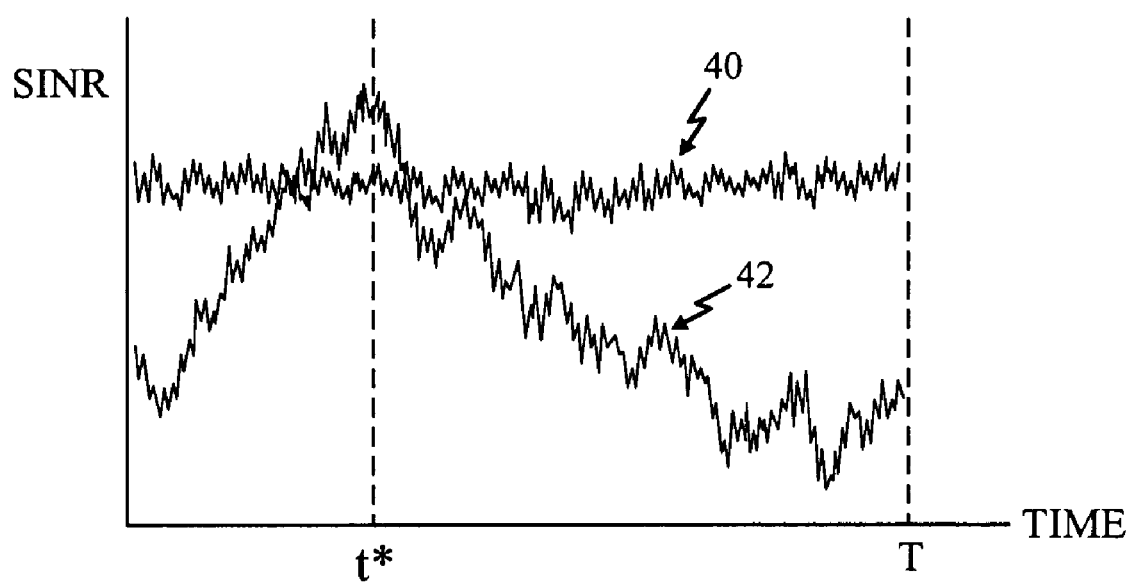
FIG. 4 is a diagram illustrating the signal-to-interference-and-noise ratio (SINR) that may be measured by a single mobile station as a function of time in one embodiment.

Referring to FIG. 4, a diagram illustrating the SINR that may be measured by a single stationary mobile station is shown as a function of time. The figure includes one curve 40 which is relatively flat and another curve 42 which is not. Curve 40 corresponds to the situation in which the base station has turned off the FPM scheme, and the strength of the signal as a function of time is relatively constant. Curve 42 corresponds to the situation in which the base station has turned on the FPM scheme and the beam sweeps through the sector periodically. Thus, curve 42 has distinct highs and lows.

Since the data rates that can be supported in transmissions to the mobile station are dependent upon the SINR of the received signal, the requested data rate is typically relatively constant for a stationary mobile station in the case of the non-beamformed transmissions (corresponding to curve 40) and varies with phase in the case of the FPM based transmissions or some other control parameter (corresponding to curve 42).

When there is a single mobile station (or there are too few mobile stations) in a base station's sector, the overall throughput of the base station is typically higher without beamforming than with beamforming. Referring to the curves of FIG. 4, the higher data rate at the peak of curve 42 is not sufficient to compensate for the lower data rates at the lower portions of the curve, in comparison to the fairly constant intermediate data rate of curve 40. This effect is mainly due to two reasons. First, as the beam gets narrower, even though the peak SINR that can be achieved in front of the beam increases, the fraction of the sector area that receives this high SINR level decreases. The peak SINR level in front of the beam usually is not sufficient to compensate for the reduced SINR levels in a large fraction of the sector area. The second reason is related to the convexity of capacity. Given a fixed average SINR level received by a mobile station, the convexity of the Shannon's channel capacity formula implies that the highest throughput would be achieved if the SINR fluctuations are minimized.

When there are many mobile stations that are positioned sufficiently uniformly throughout the sector (so that they receive their peak SINR levels mostly at different times), the overall throughput can be increased by turning on a FPM scheme or a similar scheme for artificially inducing SINR fluctuations. This is because, contrary to the case described above in which there are a small number of mobile stations, there will typically be at least one or more mobile stations receiving their peak SINR levels (and hence requesting relatively high data rates) at any given time. The base station will take advantage of this multi-user diversity by scheduling those users requesting their peak data rates at any available time for data transmission. As the number of mobile stations increases, the throughput gain will also increase. This increase is called "multi-user diversity gain". Note that with multi-user diversity, the degradation due to the convexity of channel capacity will also diminish, since each mobile station will mostly be served when its instantaneous SINR level is larger than its mean SINR level.

Figure 5:
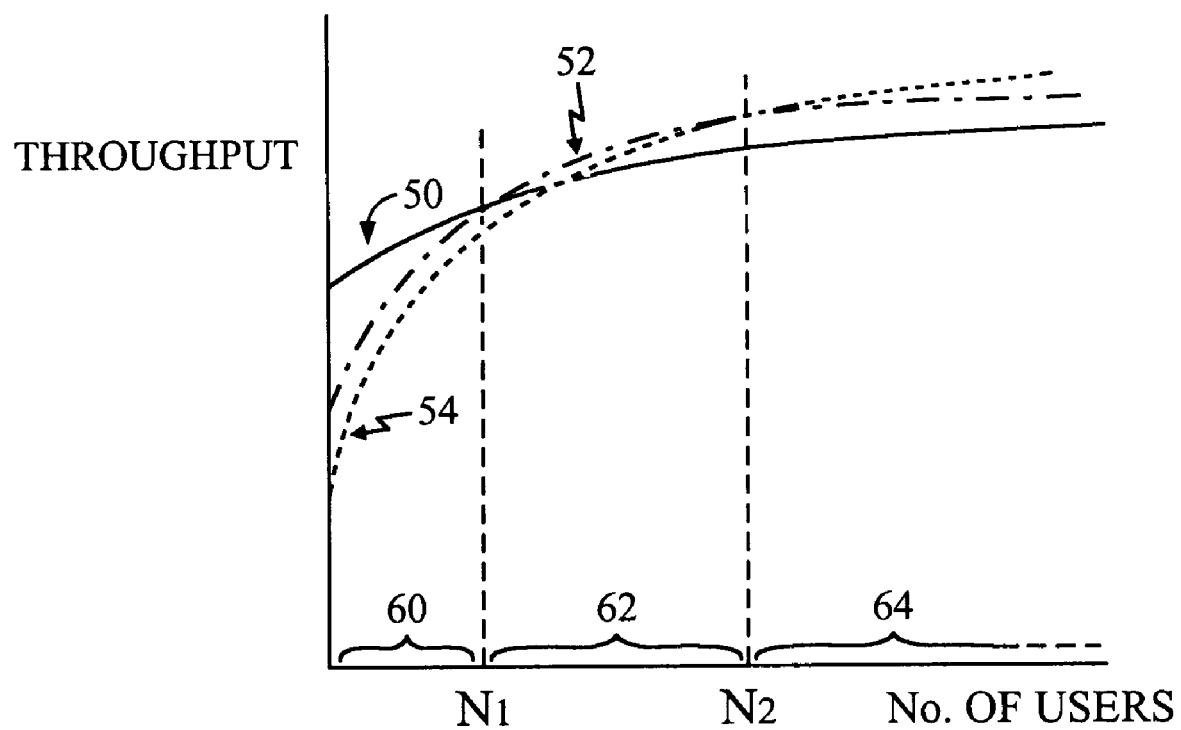
FIG. 5 is a graph illustrating the relative performance of beamforming and non-beamforming cases as a function of the number of mobile stations in a sector.

Referring to FIG. 5, a graph illustrating the relative performance of the beamforming and non-beamforming cases are shown as a function of the number of mobile stations in the sector. For a low number of mobile stations, the overall throughput of the base station is better for the non-beamforming (that is non-FPC) case 50. While throughput performance for both beamforming and non-beamforming cases increases with the number of mobile stations, the beamforming case provides the better performance after a certain number of mobile stations are in the sector. It should be noted that the performance curves will vary with the prevailing conditions (e.g., fading characteristics of the mobile stations). As a result, the point at which the curves intersect (the threshold number of mobile stations $N_1$) also depends upon the prevailing conditions.

The graph of FIG. 5 also includes a third curve 54 which corresponds to a second beamforming case. In the second beamforming case 54, the rate of rotation of the beam is higher and the beam width is narrower compared to the first beamforming case 52. The performance of the second beamforming case 54 overtakes the first beamforming case 52 when the number of mobile stations reaches a second threshold number $N_2$. As with $N_1$, the threshold number $N_2$ is dependent upon the specific conditions.

It can be seen from FIG. 5 that the performance curves define three regions 60, 62 and 64, and that each of the modes of operation associated with curves 50, 52 and 54 is optimal in a different region. As depicted in FIG. 5, non-beamforming operation (see curve 50) is optimal in range 60, the first form of beamforming (see curve 52) is optimal in range 62 and the second form of beamforming (see curve 54) is optimal in range 64. The base station therefore implements a method in which the number of mobile stations in the sector is identified and the corresponding optimal mode of operation is selected. The selection of the optimal mode of operation method is illustrated by FIG. 6.

Figure 6:
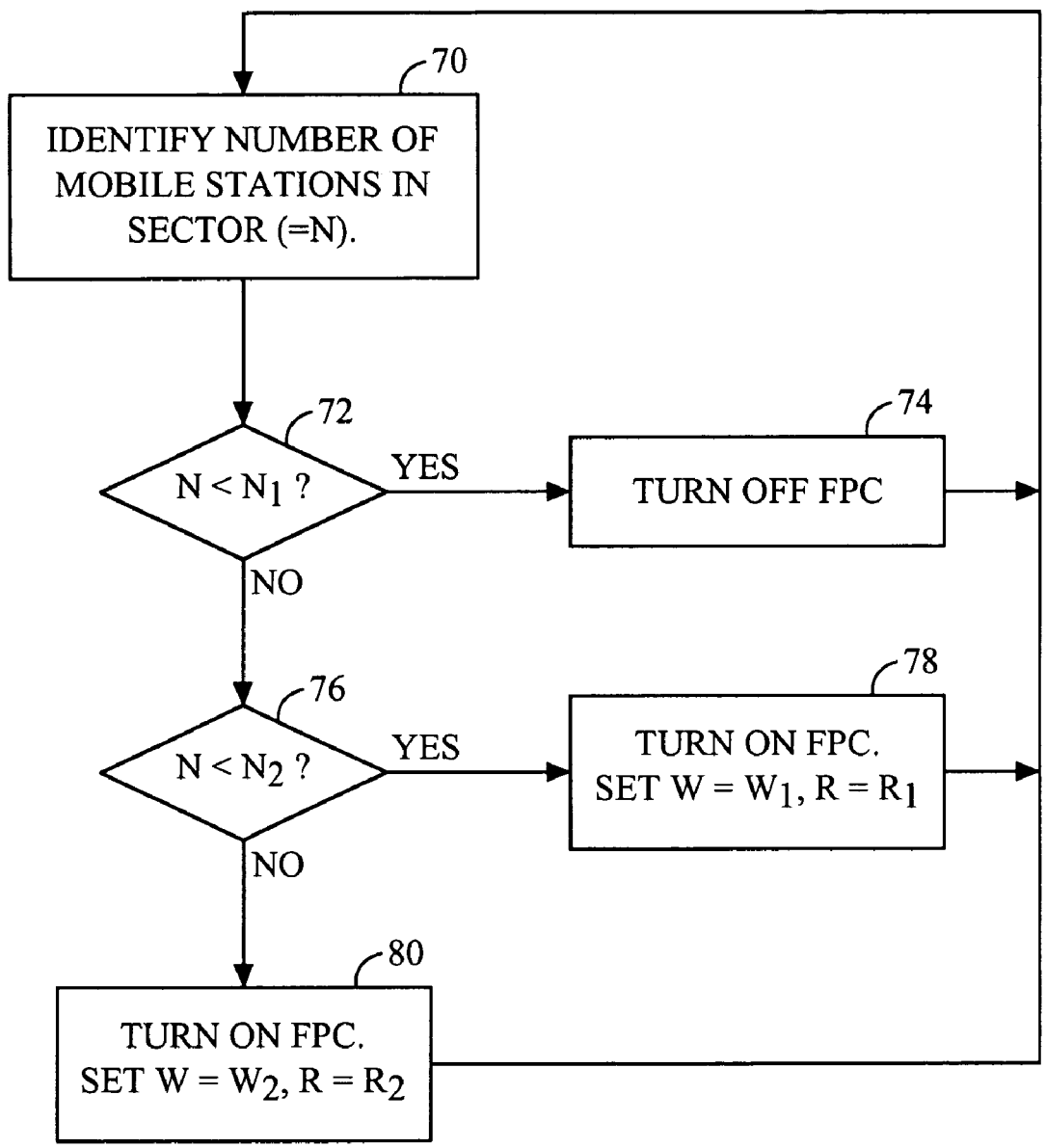
FIG. 6 is a flow diagram illustrating a method in which the number of mobile stations in a sector is identified and the corresponding optimal mode of operation is selected.

The first step of the method of FIG. 6 comprises identifying the mobile stations in the base station's sector 70. The mobile stations are identified by the DRCs which they transmit to the base station to request a particular data rate for transmissions directed to them. After the number of mobile stations is identified, this number (denoted by "N") is compared to the first threshold, $N_1$ 72. In one embodiment, threshold $N_1$ may be 2 or 3. If the number of mobile stations is less then $N_1$, the beamforming is turned off 74. In a system that forms the beam using interference from a secondary antenna, the transmissions from the secondary antenna are simply discontinued, and the overall transmission power is adjusted properly.

If the number of mobile stations, N, is greater than or equal to the first threshold, $N_1$, then the forward link is beamformed (that is, FPM turned on). It is necessary to determine the fluctuation rate and the beam width. The number of mobile stations is therefore compared to the second threshold, $N_2$ 76. In one embodiment, threshold $N_2$ may be in the range from 8 to 10. If the number of mobile stations is less than $N_2$, the beam width W and fluctuation rate R are set to $W_1$ and $R_1$, respectively 78, corresponding to the curve 52. If the number of mobile stations is greater than or equal to $N_2$, then the parameters are set to $W_2$ and $R_2$, respectively 80, corresponding to curve 54. After the mode of operation has been selected, the process repeats as new mobile stations enter the base station's sector or the existing ones exit the sector.

Although not shown in the flow diagram of FIG. 6, it may also be necessary to set the threshold values according to the prevailing circumstances. As changes occur in channel conditions, fading characteristics, etc., the threshold values may be recalculated.

Furthermore, the selection of the thresholds $N_1$ and $N_2$ and the corresponding fluctuation rate and beam width based on the exemplary graph shown in FIG. 5 is just one of many possible methods of parameter selection. For example, the curves in FIG. 5 may be based on computer simulations for particular channel models. Curves similar to the ones shown in FIG. 5 may be obtained by other means such as field tests, analytical results, or a combination of these.

It should also be noted that the flow diagram of FIG. 6 is exemplary. In another embodiment, the method may simply comprise identifying the number of mobile stations in the sector and selecting either a beamforming mode of operation or a non-beamforming mode of operation, as appropriate. On the other hand, the method of FIG. 6 could be extended to cover additional regions. That is, there could be additional threshold values at which the rate of rotation could be increased. Ultimately, a different beam width and rate of rotation could be defined for each number of mobile stations that are in the sector.

Still another embodiment may comprise a software application. The software application in this embodiment may be configured to receive data such as DRCs, identify the number of mobile stations in the sector, determine whether beamforming is to be performed and the corresponding rate of rotation, generate control signals to provide the desired beamforming, if necessary. The software application may be embodied in any of a variety of media readable by a computer or other data processor, such as a floppy disk, magnetic tape, CD-ROM, DVD-ROM, RAM, ROM, to name a few.

The various sub-components of the embodiments described above may also vary. For example, the beamforming subsystem may comprise more than two wide beam antennas, multiple highly directional antennas, or an entirely different type of beamforming mechanism. Other parameters, such as sweep range of the beam, etc., may be varied as a function of the number of users.

While the present invention has been described with reference to particular embodiments, it should be understood that the embodiments are illustrative and that the scope of the invention is not limited to such embodiments. Many variations, modifications, additions and improvements fall within the scope of the invention as detailed within the following claims.

What is claimed is:

1. A method comprising:
   identifying a number of mobile stations in a sector associated with a base station; and
   adapting an antenna gain pattern of the base station to change a rate of induced SINR fluctuations based on the number of mobile stations in the sector communicating with the base station, whereby overall data throughput from the base station is maximized as a function of the number of mobile stations communicating with the base station, wherein adapting the antenna gain pattern of the base station comprises selectively inducing changes in the antenna gain pattern, wherein changes in the antenna gain pattern are induced periodically at an optimal change rate and said SINR is calculated every halfslot.

2. The method of claim 1, wherein adapting the antenna gain pattern of the base station comprises adapting a beam width of the antenna gain pattern.

3. The method of claim 2, further comprising providing a mapping of numbers of mobile stations to optimal change rates and beam widths, wherein adapting the antenna gain pattern of the base station comprises selectively inducing changes in the antenna gain pattern at optimal change rates and beam widths selected according to the mapping.

4. The method of claim 2, wherein adapting the antenna gain pattern of the base station by adapting a beam width of the antenna gain pattern comprises optimizing an overall shape of the antenna gain pattern.

5. The method as recited in claim 1, wherein said mobile base station includes a plurality of sectors with corresponding antennas, wherein each of said plurality of sectors is adapting the antenna gain pattern of the corresponding antenna to control SINR fluctuations in the corresponding sector based on the number of mobile stations in the corresponding sector.

6. The method of claim 1, wherein identifying the number of mobile stations in the sector comprises identifying a number of mobile stations actively receiving service from the base station and further comprising varying data rates for the mobile stations receiving service from the base station based upon a SINR prediction and rate control method.

7. The method of claim 1, wherein adapting the antenna gain pattern of the base station also comprises adapting the antenna gain pattern to a fixed broad antenna gain pattern if the number of mobile stations is less than a first threshold.

8. The method of claim 7, wherein adapting the antenna gain pattern of the base station further comprises:
   inducing changes of the antenna gain pattern at a first change rate using a first beam width if the number of mobile stations in the sector is greater than the first threshold and less than a second threshold; and
   inducing changes of the antenna gain pattern at a second change rate using a second beam width if the number of mobile stations in the sector is greater than the second threshold.

9. The method of claim 7, wherein adapting the antenna gain pattern of the base station further comprises inducing changes of the antenna gain pattern at a first change rate using a first beam width if the number of mobile stations in the sector is greater than the first threshold.

10. The method of claim 9, further comprising computing the first threshold based upon one or more characteristics of mobile stations in the sector.

11. The method of claim 10, wherein the one or more characteristics of the mobile stations in the sector comprise fading characteristics of the mobile stations.

12. The method of claim 7, wherein adapting the antenna gain pattern of the base station further comprises:
   inducing changes of the antenna gain pattern in accordance with a plurality of change rates corresponding to a plurality of ranges of the number of mobile stations in the sector.

13. The method of claim 1, further comprising adapting the antenna gain pattern to a fixed broad antenna gain pattern during the transmission of broadcast information.

14. The method of claim 1, wherein the antenna gain pattern is adapted by forming a plurality of individual, substantially non-overlapping beam sub-patterns and adjusting signal gains corresponding to the individual beam sub-patterns.

15. The method of claim 1, wherein the antenna gain pattern is adapted by locating first and second forward link antennas close to each other and with boresights aligned, maintaining constant phase on signals transmitted from the first antenna and linearly shifting the phase of signals transmitted from the second antenna, wherein a directional beam sweeps across the sector.

16. The method of claim 15, wherein rotating the transmission beam comprises linearly incrementing the phase shift of the secondary signal.

17. A base station comprising:
a transmission subsystem;
a receiver subsystem configured to receive data from one or more mobile stations; and
a control subsystem coupled to receive data from the receiver subsystem indicative of a number of mobile stations in a sector of the base station, wherein the control subsystem is configured to adapt an antenna gain pattern of the transmission subsystem to change a rate of induced SINR fluctuations based on the number of mobile stations in the sector communicating with the base station, whereby overall data throughput from the base station is maximized as a function of the number of mobile stations communicating with the base station, wherein the control subsystem is configured to adapt the antenna gain pattern of the base station by selectively inducing changes in the antenna gain pattern, wherein the control subsystem is configured to induce changes in the antenna gain pattern periodically at an optimal change rate and said SINR is calculated every halfslot.

18. The base station of claim 17, wherein the control subsystem is configured to adapt the antenna gain pattern of the base station by adapting a beam width of the antenna gain pattern.

19. The base station of claim 18, wherein the control subsystem is configured to provide a mapping of numbers of mobile stations to optimal change rates and beam widths, and to adapt the antenna gain pattern of the base station by selectively inducing changes in the antenna gain pattern at optimal change rates and beam widths selected according to the mapping.

20. The base station of claim 17, wherein said mobile base station includes a plurality of sectors with corresponding antennas, wherein each of said plurality of sectors is adapting the antenna gain pattern of the corresponding antenna to control SINR fluctuations in the corresponding sector based on the number of mobile stations in the corresponding sector.

21. The base station of claim 17, wherein the control subsystem is configured to adapt the antenna gain pattern of the base station by adapting a beam width of the antenna gain pattern by optimizing an overall shape of the antenna gain pattern.

22. The base station of claim 17, wherein the control subsystem is configured to identify the number of mobile stations in the sector by identifying a number of mobile stations actively receiving service from the base station and further comprising varying data rates for the mobile stations receiving service from the base station based upon a SINR prediction and rate control method.

23. The base station of claim 17, wherein the control subsystem is configured to adapt the antenna gain pattern by adapting the antenna gain pattern to a fixed broad antenna gain pattern if the number of mobile stations is less than a first threshold.

24. The base station of claim 23, wherein the control subsystem is further configured to adapt the antenna gain pattern by: inducing changes of the antenna gain pattern at a first change rate using a first beam width if the number of mobile stations in the sector is greater than the first threshold and less than a second threshold; and inducing changes of the antenna gain pattern at a second change rate using a second beam width if the number of mobile stations in the sector is greater than the second threshold.

25. The base station of claim 23, wherein the control subsystem is further configured to induce changes of the antenna gain pattern at a first change rate using a first beam width if the number of mobile stations in the sector is greater than the first threshold.

26. The base station of claim 25, wherein the control subsystem is configured to compute the first threshold based upon one or more characteristics of mobile stations in the sector.

27. The base station of claim 23, wherein the control subsystem is further configured to adapt the antenna gain pattern to a fixed broad antenna gain pattern during the transmission of broadcast information.

28. The base station of claim 23, wherein adapting the antenna gain pattern of the base station further comprises:
inducing changes of the antenna gain pattern in accordance with a plurality of change rates corresponding to a plurality of ranges of the number of mobile stations in the sector.

29. The base station of claim 17, wherein the transmission subsystem is configured to form the antenna gain pattern by forming a plurality of individual, substantially non-overlapping beam sub-patterns and wherein the control subsystem is configured to adjust signal gains corresponding to the individual beam sub-patterns.

30. The base station of claim 29, wherein the control subsystem is configured to induce changes by periodically changing gain of each of the antenna elements and setting the gain of at least one of the antenna elements to a large value while setting the gain of at least one other antenna element to a low value.

31. The base station of claim 17, wherein the transmission subsystem is configured to form the antenna gain pattern by locating first and second forward link antennas close to each other and with boresights aligned and transmitting first and second signals therefrom, wherein the control subsystem is configured to maintain constant phase on the first signal and to linearly shift the phase of the second signal, wherein a directional beam sweeps across the sector.

32. The base station of claim 31, wherein the control subsystem is configured to rotate the transmission beam by linearly incrementing the phase shift of the secondary signal.

33. A software program product embodied in a medium readable by a data processor, wherein the software program product embodies the method comprising:
identifying a number of mobile stations in a sector communicating with a base station having a transmission beam;
if the number of mobile stations in the sector is greater than a first threshold, causing the transmission beam to be rotated and to periodically sweep through the sector; and
if the number of mobile stations in the sector is less than the first threshold, causing the beamforming to be suspended, wherein adapting the antenna gain pattern of the base station comprises selectively inducing changes in the antenna gain pattern to change a rate of induced SINR fluctuations based on the number of mobile stations in the sector communicating with the base station, wherein changes in the antenna gain pattern are induced periodically at an optimal change rate and said SINR is calculated every halfslot.

34. The software program product of claim 33, wherein adapting the antenna gain pattern of the base station comprises adapting a beam width of the antenna gain pattern.

35. The software program product of claim 34, wherein the method further comprises providing a mapping of numbers of mobile stations to optimal change rates and beam widths, wherein adapting the antenna gain pattern of the base station comprises selectively inducing changes in the antenna gain pattern at optimal change rates and beam widths selected according to the mapping.

36. The software program product of claim 33, wherein said mobile base station includes a plurality of sectors with corresponding antennas, wherein each of said plurality of sectors is adapting the antenna gain pattern of the corresponding antenna to induce SINR fluctuations in the corresponding sector based on the number of mobile stations in the corresponding sector.

37. The software program product of claim 33, wherein adapting the antenna gain pattern of the base station comprises adapting a beam width of the antenna gain pattern by optimizing an overall shape of the antenna gain pattern.

38. The software program product of claim 33, wherein adapting the antenna gain pattern of the base station comprises adapting the antenna gain pattern to a fixed broad antenna gain pattern if the number of mobile stations is less than a first threshold.

39. The software program product of claim 38, wherein adapting the antenna gain pattern of the base station further comprises: inducing changes of the antenna gain pattern at a first change rate using a first beam width if the number of mobile stations in the sector is greater than the first threshold and less than a second threshold; and inducing changes of the antenna gain pattern at a second change rate using a second beam width if the number of mobile stations in the sector is greater than the second threshold.

40. The software program product of claim 38, wherein adapting the antenna gain pattern of the base station further comprises: inducing changes of the antenna gain pattern in accordance with a plurality of change rates corresponding to a plurality of ranges of the number of mobile stations in the sector.

41. The software program product of claim 38, wherein adapting the antenna gain pattern of the base station further comprises inducing changes of the antenna gain pattern at a first change rate using a first beam width if the number of mobile stations in the sector is greater than the first threshold.

42. The software program product of claim 41, wherein the method further comprises computing the first threshold based upon one or more characteristics of mobile stations in the sector.

43. The software program product of claim 33, wherein the method further comprises adapting the antenna gain pattern to a fixed broad antenna gain pattern during the transmission of broadcast information.

44. The software program product of claim 33, wherein the antenna gain pattern is adapted by forming a plurality of individual, substantially non-overlapping beam sub-patterns and adjusting signal gains corresponding to the individual beam sub-patterns.

45. The software program product of claim 44, wherein changes are induced by periodically changing each of the sub-patterns and setting its gain to a large value while setting the other sub-pattern gains to low values.

46. The software program product of claim 33, wherein the antenna gain pattern is adapted by locating first and second forward link antennas close to each other and with boresights aligned, maintaining constant phase on signals transmitted from the first antenna and linearly shifting the phase of signals transmitted from the second antenna, wherein a directional beam sweeps across the sector.

47. The software program product of claim 46, wherein rotating the transmission beam comprises linearly incrementing the phase shift of the secondary signal.

* * * * *